United States Patent

Johnson et al.

Patent Number: 6,149,137
Date of Patent: Nov. 21, 2000

[54] METHOD AND APPARATUS FOR QUENCHING HOT FLUE GASES

[75] Inventors: Bruce C. Johnson, Broken Arrow; Robert R. Trimble, Sand Springs; Randhir C. Desai, Tulsa, all of Okla.

[73] Assignee: Callidus Technologies, Inc., Tulsa, Okla.

[21] Appl. No.: 09/184,751

[22] Filed: Nov. 2, 1998

[51] Int. Cl.⁷ ..................................................... B01F 3/04
[52] U.S. Cl. ........................ 261/27; 261/69.1; 261/78.2; 261/121.1; 261/DIG. 9; 261/DIG. 54
[58] Field of Search ............................... 261/76, 77, 78.2, 261/121.1, 26, 27, DIG. 9, DIG. 54, DIG. 56, 69.1; 96/253, 265, 323, 351, 353, FOR 117, FOR 146, 245

[56] References Cited

U.S. PATENT DOCUMENTS

| | | | |
|---|---|---|---|
| 2,420,795 | 5/1947 | Phillips | 261/76 |
| 3,321,191 | 5/1967 | Najarian. | |
| 3,547,055 | 12/1970 | Zanft. | |
| 3,572,264 | 3/1971 | Mercer. | |
| 3,615,165 | 10/1971 | Clement. | |
| 3,656,441 | 4/1972 | Grey et al.. | |
| 3,793,809 | 2/1974 | Tomany et al. | 261/DIG. 54 |
| 3,870,082 | 3/1975 | Holl. | |
| 3,907,674 | 9/1975 | Roberts et al.. | |
| 4,356,009 | 10/1982 | Calvert | 261/DIG. 54 |
| 4,489,679 | 12/1984 | Holt. | |
| 4,530,347 | 7/1985 | Baker et al.. | |
| 4,552,305 | 11/1985 | Houston. | |
| 4,658,803 | 4/1987 | Ball et al.. | |
| 4,778,483 | 10/1988 | Martin et al. | 96/351 |
| 4,828,578 | 5/1989 | Den Bleyker | 96/351 |
| 5,249,740 | 10/1993 | Serria Iosio et al. | 261/78.2 |
| 5,520,714 | 5/1996 | Maschelknautz. | |
| 5,586,995 | 12/1996 | Vollhardt et al.. | |

FOREIGN PATENT DOCUMENTS 288883  11/1971  U.S.S.R. .......................... 96/FOR 117

OTHER PUBLICATIONS

Anderson 2000 Inc., Venturi scrubbers for fine particulate emission control, Bulletin #78–900075, Revision B, Dec., 1982.
Brady, "Understanding venturi scrubbers for air pollution control," *Plant Engineering*, Technical Publishing, 1982.
Catalog 401A, The Sly Venturi Scrubber.
Nittetu Chemical Engineering, Environment Control Processes.
T–Thermal® Company, pp. 4 and 10.
Tomany, "Wet scrubbers—Applications and limitations," pp. 29–36.

*Primary Examiner*—David A. Simmons
*Assistant Examiner*—Robert A. Hopkins
*Attorney, Agent, or Firm*—Fulbright & Jaworski

[57] ABSTRACT

A quench system for cooling hot flue gases from combustion systems is disclosed. The quench system includes a venturi mounted in a quench vessel. The water level in the quench vessel may be raised or lowered in accordance with the flow rate of the gases to be quenched. When the pressure drop across the venturi is insufficient to achieve the desired cooling to adiabatic saturation temperature, the water level is increased so that the downcomer connected to the venturi is submerged and the additional pressure drop further cools the flue gases.

10 Claims, 3 Drawing Sheets

METHOD AND APPARATUS FOR QUENCHING HOT FLUE GASES

BACKGROUND OF THE INVENTION

1. Field of the Invention

This invention generally relates to quench systems for cooling hot flue gases from combustion systems. More specifically, the invention relates to a method and apparatus to cool hot flue gases from thermal oxidation of chemical wastes to their adiabatic saturation temperature.

2. Description of the Related Art

Flue gases from thermal oxidation processes frequently require cooling to their adiabatic saturation temperature to enable them to be further processed (i.e., in a packed column absorber, venturi scrubber, etc.), before they are discharged to the atmosphere. Hot flue gases from thermal oxidation systems have temperatures typically in the range of 1400 to 2000 degrees F. The adiabatic saturation temperature is the minimum gas temperature which can be achieved using water evaporation when there is no other heat loss from the system. The adiabatic saturation temperature will vary with the system pressure, water content of the hot flue gas, and other factors, but is largely a function of the temperature of the incoming hot flue gases. When hot flue gas temperatures are in the range of 1400 to 2000 degrees F., the adiabatic saturation temperatures are in the range of approximately 150 to 195 degrees F.

Many hot flue gas quench systems achieve adiabatic cooling of hot flue gases by using spray nozzles in a duct or spray contactor vessel. Typically, numerous nozzles are connected to the water source, and the nozzles take a pressure drop of approximately 80–100 psi to produce fine water drops which promote rapid cooling of the hot flue gases passing through the duct. Spray nozzle cooling systems have several significant disadvantages including substantial valving and piping requirements, and the tendency of the nozzles to corrode or erode and to plug up with solid particles which are frequently present in the hot and usually corrosive recycled spray water. In addition, a high pressure pump is needed to supply the nozzles with water at the required pressure.

Venturi scrubbers have been used for removing pollutants, either solids or gaseous, from gas streams, by contacting the gas stream with a finely divided liquid, i.e., water droplets. Solid particles or gases are absorbed by the water droplets which are subsequently coalesced and the liquid containing the solids or gases removed. A venturi scrubber accelerates the gas stream to a high velocity, and the throat may be adjustable, if desired, to permit variation of the pressure drop during operation. The pressure drop is important because it determines the size of water droplets which largely determines the venturi's performance. For example, Sly Manufacturing and Andersen 2000 Inc. market venturi scrubbers having adjustable throats. At the venturi throat, where the gas stream is accelerated to a high velocity, the gas stream comes into contact with a scrubbing liquid that is introduced. The primary purpose of a scrubber is maximum contact of the gas and fluid streams with the most effective use of the required pressure drop. Downstream from the venturi throat, the particulate-laden droplets collide, agglomerate in a vessel or storage tank, and may be collected for disposal.

The venturi scrubbers described above also have been used for cooling hot flue gases. For example, some venturi scrubbers are mounted in duct work. Venturi scrubbers often include a separator downstream of the venturi for removing the water droplets from the gas stream.

Flow rates of hot flue gases from thermal oxidation vary considerably during operation. To accommodate these changes and to achieve the adiabatic saturation temperature for the exhaust gases at different flow rates, devices have been used for adjusting the throat of the venturi so that the pressure drop may be changed. Some devices for adjusting the venturi throat have disadvantages including difficulty of maintaining seals against high pressure, erosion due to high velocities in the venturi throat, corrosion problems associated with acidic or basic liquids flowing through the ducts, and space requirements for the apparatus used for adjusting the throat.

Another method of handling varying flow rates through a venturi is to size the venturi for a high pressure drop at maximum flow conditions which would still allow for a sufficient pressure drop at low flow rates. However, this would be a very energy intensive means of operation because of the combustion air fan power requirements for such a venturi.

Another alternative for cooling hot flue gases is a submerged quench system marketed by T-Thermal Company which bubbles hot gases through a pipe submerged in water to achieve adiabatic cooling of hot flue gases. A disadvantage of a submerged quench system is the potential for turbulent wave action which could cause high mechanical stress to the equipment, and wave action in the water tank which could result in pressure pulses in the system.

SUMMARY OF THE INVENTION

The present invention overcomes the above problems and disadvantages by providing a quench system for hot flue gases that is operable at high efficiency to cool the gases to their adiabatic saturation temperature and accommodate variations in the flow rate of hot flue gases. The invention eliminates the need for spray nozzles for cooling the flue gases. The invention includes a passage having a venturi positioned inside a quench tank. The water level in the quench tank is controlled as a function of the flow rate of hot flue gases from the thermal oxidizer through the passage. Water that is introduced adjacent to the venturi, preferably in a wier, is sheared into very fine mist or droplets as it passes through the venturi. It is these very fine droplets that promote the rapid cooling of the hot flue gases to their adiabatic saturation temperature. It is also these very fine drops which are produced in the venturi, rather than from spray nozzles used previously.

The water level in the quench tank is continuously variable and is controllable by a number of alternative methods, including but not limited to methods based on the pressure drop across the venturi throat, temperature in the outlet passage, or monitoring the heat release. At designed flue gas flowrates, the water level in the quench tank can be maintained at a level below that of the downcomer from the venturi, whereby the adiabatic saturation temperature is achieved without submerging the downcomer to minimize agitation of the quench vessel. However, the system of the present invention also allows raising the water level in the quench tank sufficiently to submerge the downcomer at lower flue gas flowrates. At lower flue gas flowrates, additional cooling may be required to achieve the adiabatic saturation temperature. A lower gas flowrate results in a smaller pressure drop through the venturi, reducing the production of small water droplets needed for rapid and complete cooling of the hot flue gas stream. To assure that the hot flue gases are cooled to the adiabatic saturation temperature at lower gas flowrates, the present invention increases the water level in the quench tank and, if necessary, increases the water level sufficiently to submerge the downcomer and further cool the gases to their adiabatic saturation temperature. Not only does the present invention provide cooling of hot flue gases, but it also removes some particles in the hot flue gases, and enhances acid gas absorption.

Additionally, the present invention provides an apparatus and method for efficiently heating the water in the quench vessel to a desired temperature, permitting the equipment to be used as a liquid heater or a liquid heater/evaporator.

DETAILED DESCRIPTION OF A PREFERRED EMBODIMENT

Figure 1:
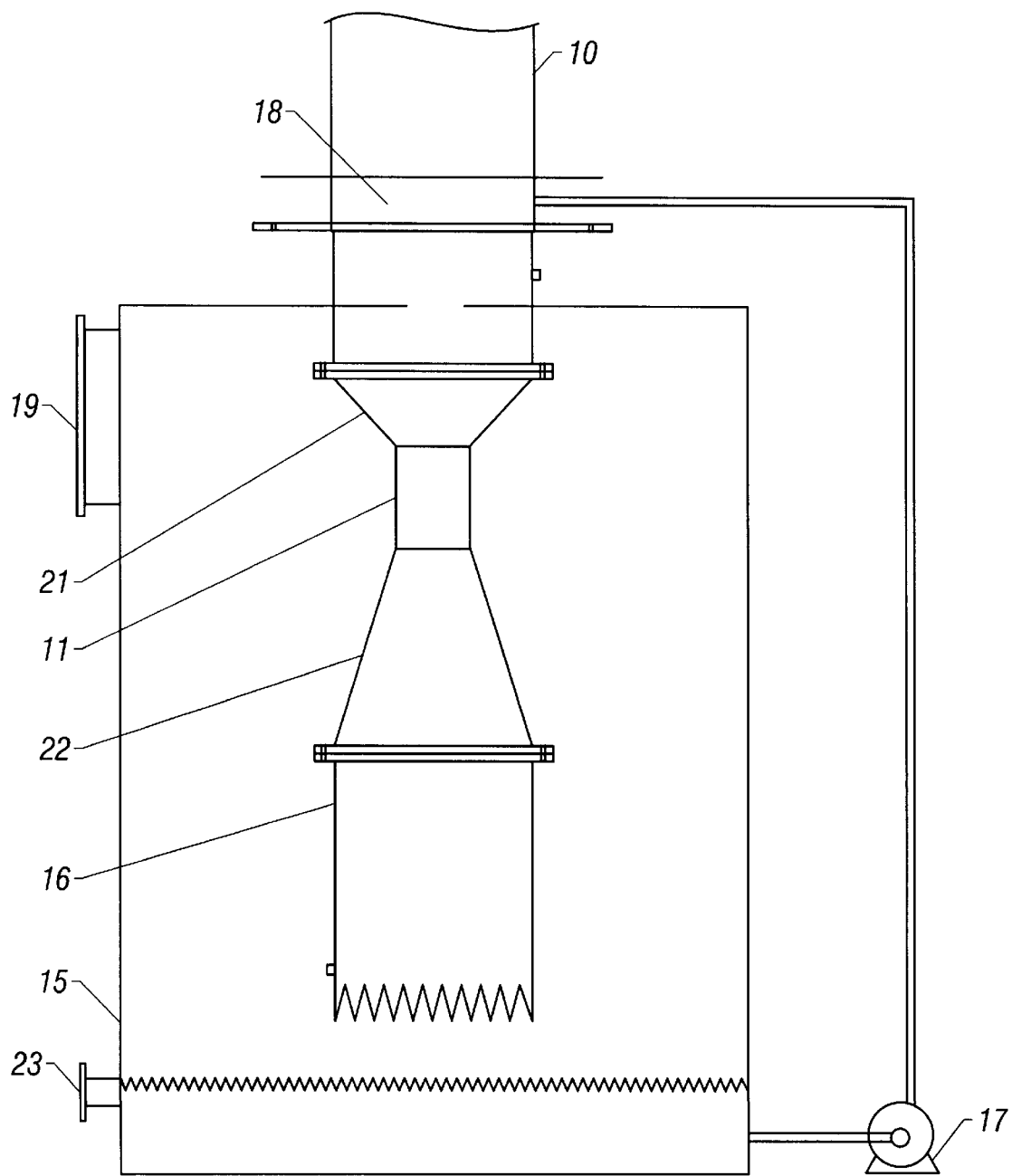
FIG. 1 is a cross-section view of the quench system according to a preferred embodiment of the present invention.
Figure 2:
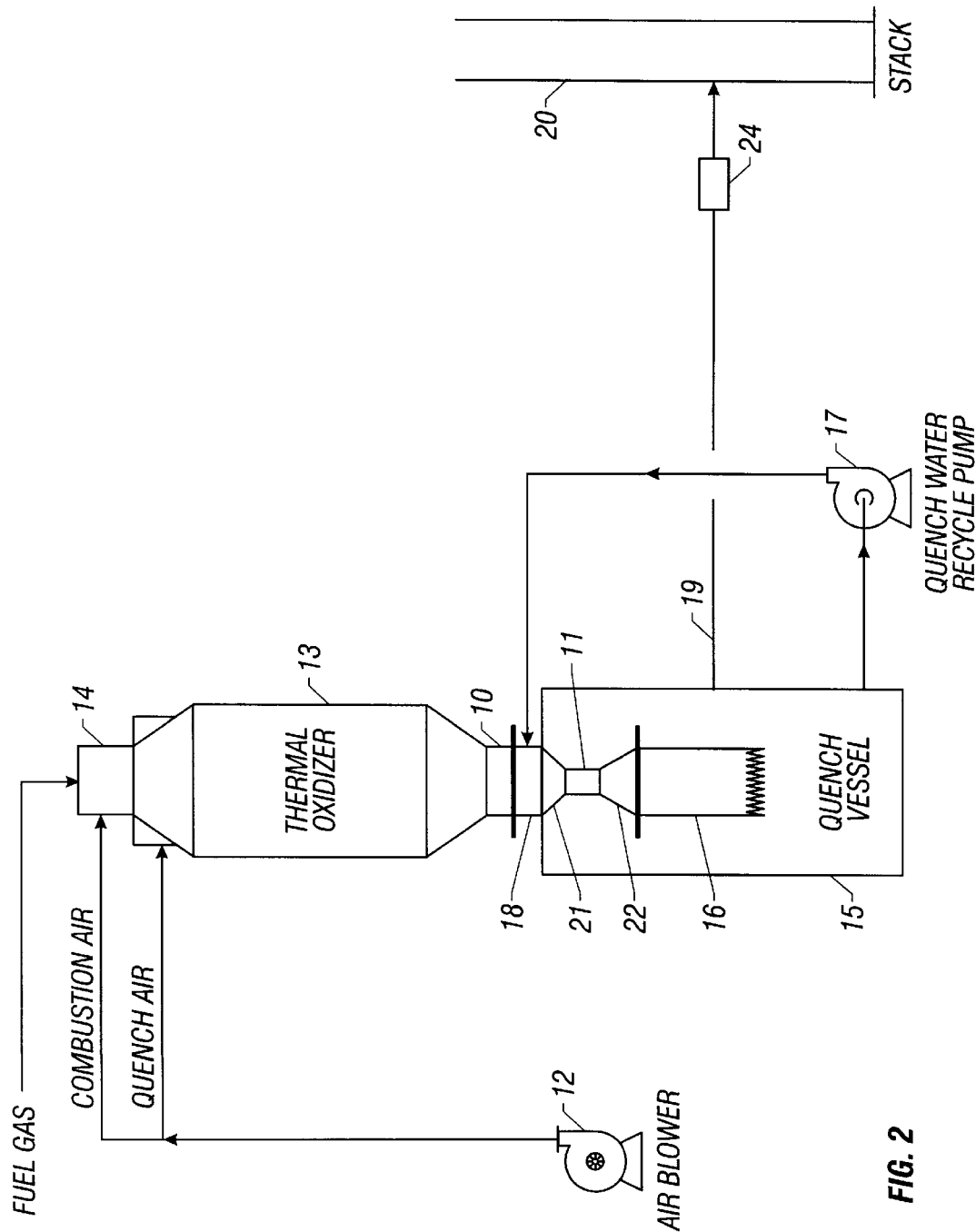
FIG. 2 is a schematic showing the apparatus for quenching hot glue gases according to the present invention.

As shown in FIG. 1 and FIG. 2, passage 10 is connected to thermal oxidizer 13. Air blower 12 provides combustion air and quench air to the thermal oxidizer. Fuel gas also is provided through inlet 14 to the thermal oxidizer. Hot flue gases entering passage 10 from the thermal oxidizer are typically at temperatures in the range of 1400 to 2000 degrees F. Water is introduced into passage 10 adjacent venturi 11, either upstream or at the venturi throat In a preferred embodiment, waste water pump 17 provides recycle water from quench vessel 15 to wier 18, which provides a flow of water down the sides of passage 10. Water introduced into the passage forms small droplets and/or mist as it passes through the venturi. Additionally, introduction of water into the passage assists in cooling the sides of the passage.

Venturi 11 is mounted within quench vessel 15. Preferably, venturi 11 has a fixed internal diameter throat. Hot flue gases enter the first, converging end 21 of venturi 11, and contact the water mist or droplets in the throat section. When the hot flue gases enter the venturi at high flow rates, they shear the water entering the venturi into very fine droplets and the gases exit the diverging end 22 of the venturi.

Downcomer 16 is connected to the diverging end of the venturi, extending further into the quench vessel. After emerging from the downcomer, the cooled flue gases exit the quench vessel through outlet 19 to particle remover or acid gas absorber 24 and, following particle and/or acid removal, to stack 20. In a preferred embodiment, the discharge end of downcomer 16 has a V-shaped serrated edge. It is preferred that each of the V-shaped serrations on the lower surface be 6 inches from tip to base and approximately 4 inches wide. However, other dimensions, holes or slots may be included in the lower surface of the downcomer.

According to the present invention, the water level in the quench vessel is continuously variable and is controlled by monitoring one or more parameters indicative of the flow rate of hot flue gases through passage 10. Makeup water enters the quench vessel through inlet 23. The parameters indicative of the flow rate include but are not limited to the pressure drop across the venturi throat, the temperature of the flue gases in outlet 19, or the volume of incoming flue gases.

In a preferred embodiment of the present invention, a thermocouple in the quench vessel senses the temperature of the gas exiting downcomer 16. A specified adiabatic saturation temperature, generally in the range of 150 to 195 degrees F., can be preset. The thermocouple is connected to a controller that opens a water valve which delivers water to inlet 23 to add water to the quench tank. When the gas temperature exceeds the preset adiabatic saturation temperature, inlet 23 is opened until either the water level reaches a predetermined level or the temperature is reduced to the adiabatic saturation temperature.

A preferred embodiment of the present invention was tested with and without the discharge end of the downcomer submerged in the quench vessel. In a test with the downcomer not submerged, an 8.25 inch diameter fixed throat venturi with a throat length of 12 inches was mounted inside a quench vessel downstream of a thermal oxidizer. During these conditions of operation, 2738 SCFH of natural gas was provided through fuel gas inlet 14 and an air flow rate of approximately 960 SCFM was provided by the combustion air blower 12. The flue gas temperature was 1595 degrees F. exiting from the thermal oxidizer, while the quenched flue gas temperature exiting the venturi was 168 degrees F. for the above range of conditions. Upstream of the venturi was a water wier which admitted water at rates between 29 and 57 gallons per minute, producing a pressure drop of 3.5 to 5.8 inches water column across the venturi.

Tests also were conducted without submerging the downcomer at a water flow rate of 30 to 56 gpm from the wier, 3526 SCFH of natural gas, and approximately 1250 SCFM from the air blower. The temperature of the flue gases was 1593 degrees F. from the thermal oxidizer, which was reduced to 168 degrees F. at the venturi exit. In these tests, the pressure drop across the venturi was between 6.3 and 8.8 inches water column.

In other tests with an 8.25 inch i.d. venturi, the hot flue gas flow rate was reduced to find the approximate point that the pressure drop in the fixed throat venturi was insufficient to adequately cool the flue gases to their adiabatic saturation temperature. It was found that the pressure drop across the 8.25 inch i.d. venturi should be at least in the range of 3 to 3.5 inches if the adiabatic saturation temperature is to be achieved without submerging the downcomer in the quench vessel.

Tests of the invention also were performed under similar conditions with the downcomer exit submerged in the water in the bottom of the quench vessel. Flue gas from the thermal oxidizer was cooled to an adiabatic saturation temperature in the range between 161 and 169 degrees F. In one such test where the downcomer was submerged, the pressure drop was 0.7 inches across the venturi and 4 inches between the inside of the downcomer and the water surface within the quench vessel, for a total pressure drop of 4.7 inches. Thus, when the pressure drop across the venturi alone was insufficient (i.e., 0.7 inch water column) for the hot flue gases to cool to their adiabatic saturation temperature, the additional pressure drop due to submerging the downcomer (4.0 inch water column) in the quench tank further cooled the flue gases sufficiently to reach that temperature.

A venturi having an inner diameter of 10.75 inches also was tested under similar conditions as described previously. With the incoming temperature between 1353 and 1597 degrees F., a flue gas flow rate calculated to be 104 to 130 ACFS, and water flow from the wier at 38 to 66 gpm, the pressure drop was 2.9 to 4.0 across the venturi.

It was observed that the square rule generally applies such that the pressure drop across the venturi increases as the square of the flow rate (i.e., if the flow rate of the flue gas is doubled, the pressure drop across the venturi increases by 4×). The pressure drop across the venturi also is a function of the liquid flow rate to the venturi. When water flow rates through the throat of passage 10 were similar (i.e., in gallons per minute per linear circumferential inch), and the gas flow rate per cross-sectional area is held constant, similar pressure drops resulted across the venturi having different diameters (8.25 and 10.75 inches).

In a preferred embodiment, if the exit temperature of the gases from the quench vessel is detected to be more than approximately 2 degrees over the normal operating conditions (exceeding the adiabatic saturation temperature which is generally in the range of 150 to 195 degrees F.), the water inlet to the quench tank is opened to allow the water level to be raised about 4 inches. While testing has shown that this water level provided the additional pressure drop required to achieve the adiabatic saturation temperature for the specified set of conditions, the water level could be raised further if the desired temperature was not achieved within a specified time period.

The size and shape of the venturi may be varied considerably depending on flow rates and other factors. For example, if the venturi is smaller than a 8.25 inch i.d. or larger than a 10.75 inch i.d. described herein, a lower or higher pressure drop, respectively, may be required across the venturi for the hot flue gases to be cooled to their adiabatic saturation temperature. The pressure drop depends on a number of factors including the amount of water provided to the venturi, the area of the venturi, and the physical configuration or geometry of the venturi throat. The venturi must accelerate the flue gases and provide for contact between the flue gases and water in the venturi throat.

A water level detector measures and monitors the water level inside quench vessel 15. A pressure transducer or float system may be used to indicate the water level so that the makeup water inlet may be closed or opened at the desired water level. Preferably, the quench vessel includes approximately 12 inches of water when the downcomer is not submerged.

Figure 3:
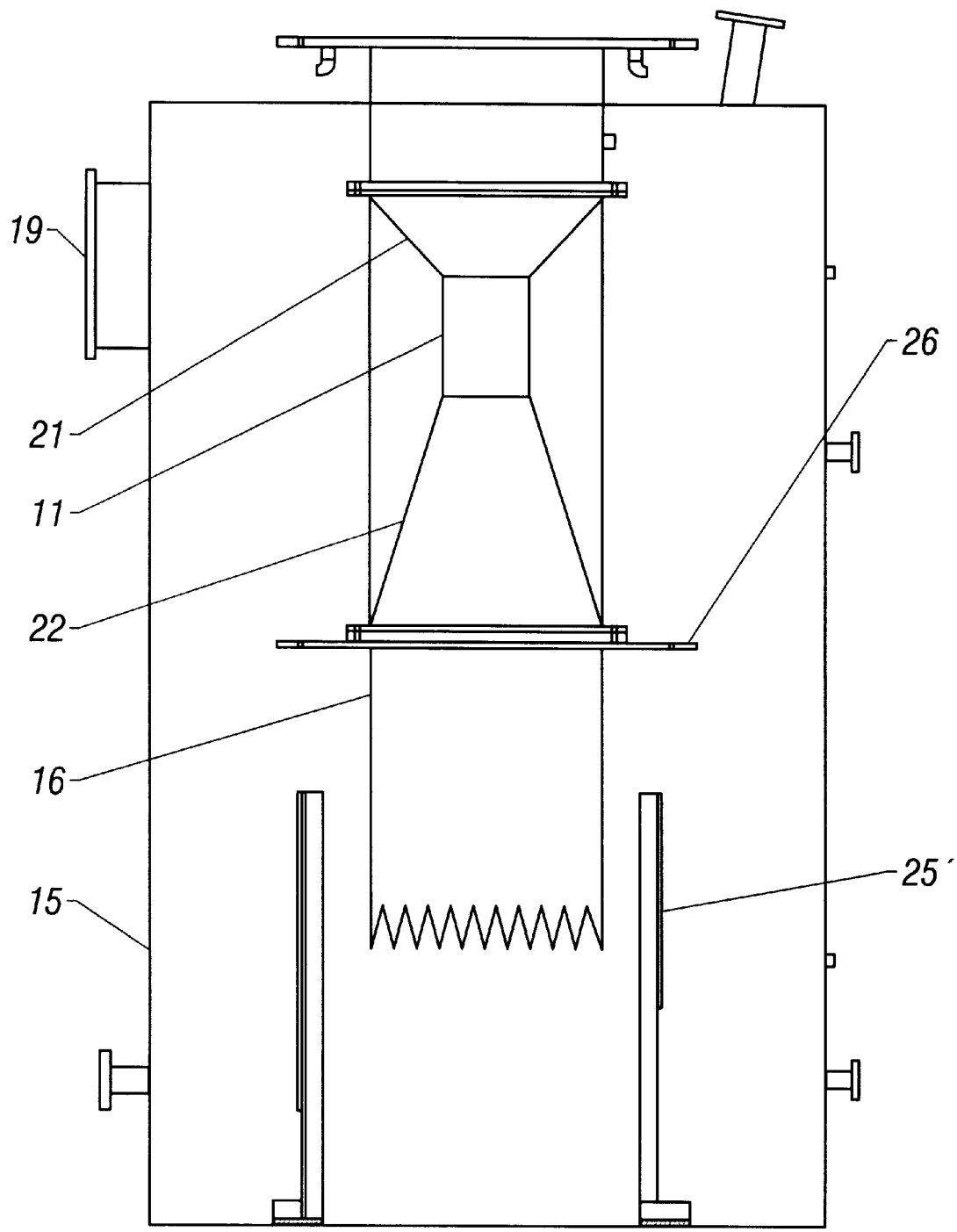
FIG. 3 is a cross-section view of the baffles used in the quench vessel according to a preferred embodiment of the invention.

As shown in FIG. 3, one or more baffles are mounted inside the quench vessel to minimize wave action and excessive turbulence. The preferred embodiment includes a cylindrical-shaped baffle 25 around the downcomer which reduces wave action in the quench vessel, and a horizontal baffle 26 situated above the vertical baffle, which reduces carryover by deflecting any upwardly entrained water droplets to the sides of the quench vessel. These baffles help maintain the desired water level in the quench vessel by reducing the carryover of water droplets and reduce vibration and possible mechanical failure of equipment.

It will now be understood by those of skill in the art that an improved apparatus and method for quenching hot flue gases may be made and used according to the present invention. Although variations in the embodiment of the present invention may not each realize all the advantages of the invention, certain features may become more important than others in various applications of the apparatus and method. The invention, accordingly, should be understood to be limited only by the scope of the appended claims.

What is claimed is:

1. An apparatus for cooling hot flue gases from a combustion system comprising:
   (a) a quench vessel having a water level and a passage mounted therein, the passage receiving exhaust of the combustion system, the passage having a ventri;
   (b) means for introducing water into the passage adjacent the venturi; and
   (c) means for detecting the pressure drop across the venturi and raising the water level in the quench vessel in response thereto.

2. The apparatus of claim 1 wherein the venturi has a fixed internal diameter throat.

3. The apparatus of claim 1 wherein the means for introducing water into the passage comprises a wier.

4. An apparatus for cooling hot flue gases from combustion systems comprising:
   (a) a passage having an inlet and an outlet, a venturi throat therebetween, and a water outlet into the passage near the venturi throat, for causing a pressure drop of hot flue gases flowing therethrough; and
   (b) an enclosure surrounding the outlet of the passage, the enclosure having a volume of water therein, the water level being increasable to submerge the outlet of the passage and decreasable to expose the outlet of the passage based on at least one parameter of the hot flue gases.

5. The apparatus of claim 4 further comprising means for detecting the water level.

6. The apparatus of claim 4 further comprising means for recycling water from the enclosure to the passage to cool the hot flue gases.

7. The apparatus of claim 4 wherein the parameter is the pressure drop of the hot flue gases.

8. The apparatus of claim 4 wherein the parameter is the temperature of the hot flue gases.

9. The apparatus of claim 4 wherein the parameter is the flow rate of the hot flue gases.

10. A method for quenching hot flue gases from combustion systems comprising:
    (a) passing the hot flue gases through a passage having a venturi;
    (b) introducing water into the passage adjacent the venturi;
    (c) detecting the pressure drop across the venturi; and
    (d) passing the hot flue gases through water in a quench tank if the pressure drop is below a preset value.

* * * * *